United States Patent
Mizutani

(10) Patent No.: US 8,756,491 B2
(45) Date of Patent: Jun. 17, 2014

(54) PDL DATA PROCESSING DEVICE

(75) Inventor: Norio Mizutani, Mie-ken (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 953 days.

(21) Appl. No.: 12/876,853

(22) Filed: Sep. 7, 2010

(65) Prior Publication Data

US 2011/0060982 A1   Mar. 10, 2011

(30) Foreign Application Priority Data

Sep. 7, 2009 (JP) ................................. 2009-205503

(51) Int. Cl.
*G06F 17/00* (2006.01)

(52) U.S. Cl.
USPC ............................ 715/234; 715/251; 715/253

(58) Field of Classification Search
USPC ................ 715/234, 251, 253; 358/3.21–3.23
See application file for complete search history.

(56) References Cited

U.S. PATENT DOCUMENTS

| | | | | |
|---|---|---|---|---|
| 8,310,713 B2 * | 11/2012 | Sugimoto et al. | ............ | 358/1.18 |
| 8,310,719 B2 * | 11/2012 | Yabe | ................ | 358/1.9 |
| 2008/0024802 A1 | 1/2008 | Kato | | |
| 2009/0147308 A1 | 6/2009 | Hasegawa | | |

FOREIGN PATENT DOCUMENTS

| | | |
|---|---|---|
| EP | 0578264 A2 | 1/1994 |
| JP | 2008-033812 A | 2/2008 |

OTHER PUBLICATIONS

Microsoft: "XML Paper Specification", Internet citation, Oct. 18, 2006, pp. 221-233, Retrieved from the Internet: URL:http://www.microsoft.com/whdc/xps/xpsspec.mspx [retrieved on Feb. 4, 2013].

European Patent Office, extended European Search Report for European Patent Application No. 10251203.5 (counterpart European patent application), dated Feb. 25, 2013.

* cited by examiner

*Primary Examiner* — Adam M Queler
*Assistant Examiner* — Howard Cortes
(74) *Attorney, Agent, or Firm* — Merchant & Gould P.C.

(57) ABSTRACT

A PDL data processing device may obtain PDL data and create drawing data utilizing the PDL data. The PDL data may include resource part data, page part data, and deletion part data. In a case of N in 1 or 1 in N, the PDL data processing device may be configured to delete a first set of the resource part data indicated by a first set of data information included in a first set of the deletion part data including a first set of page information indicating a page number L+1, subsequent to a creation for a first set of the drawing data by utilizing a first set of the page part data being associated with a page number L, and prior to a creation for a second set of the drawing data by utilizing a second set of the page part data being associated with the page number L+1.

9 Claims, 9 Drawing Sheets

FIG. 5   In Case of 1 in 2
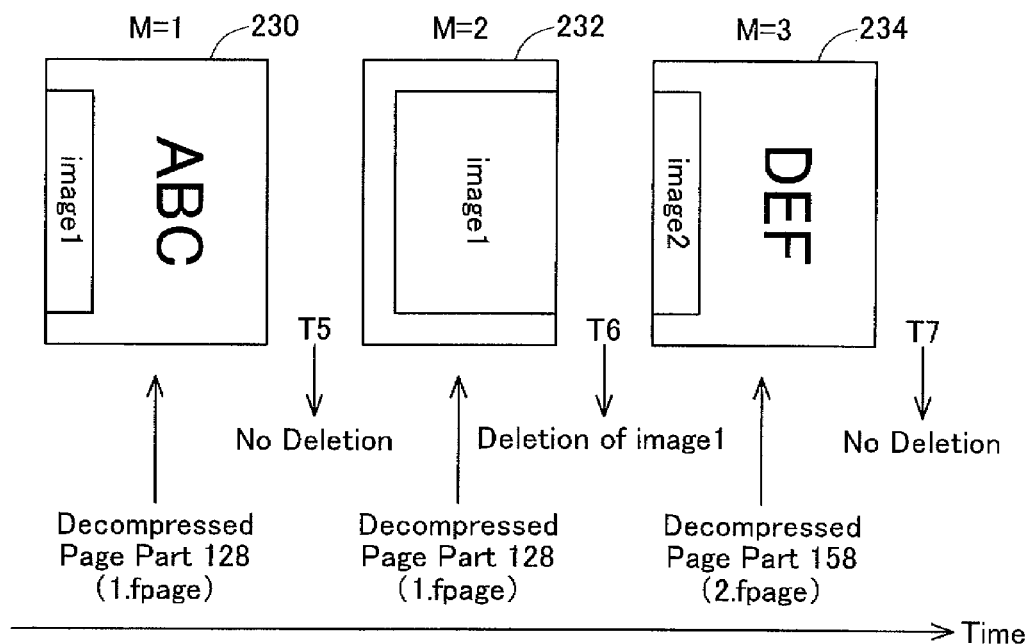
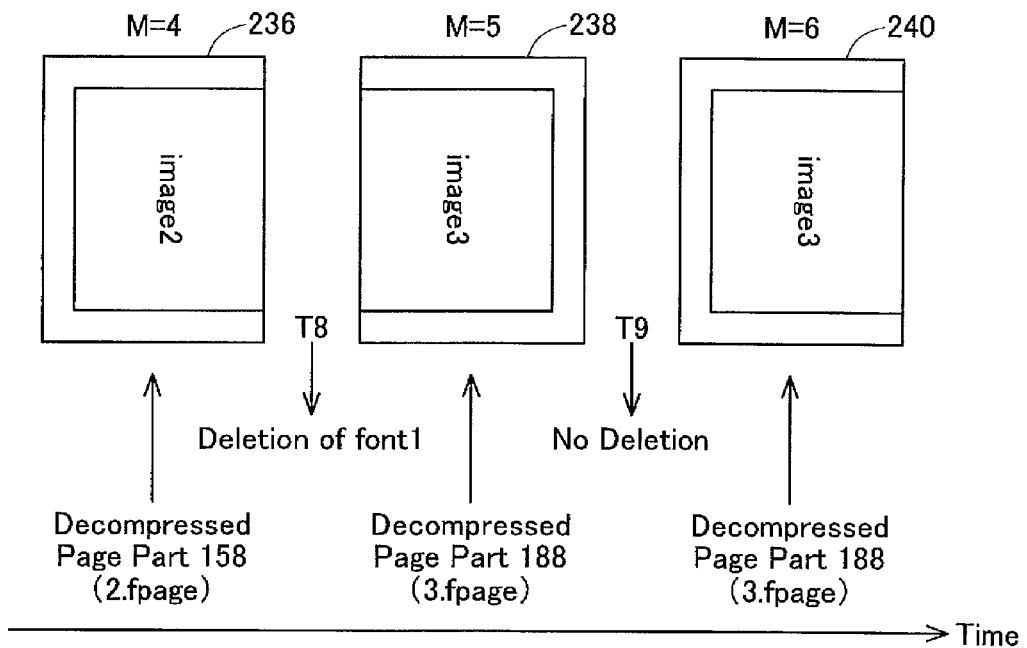

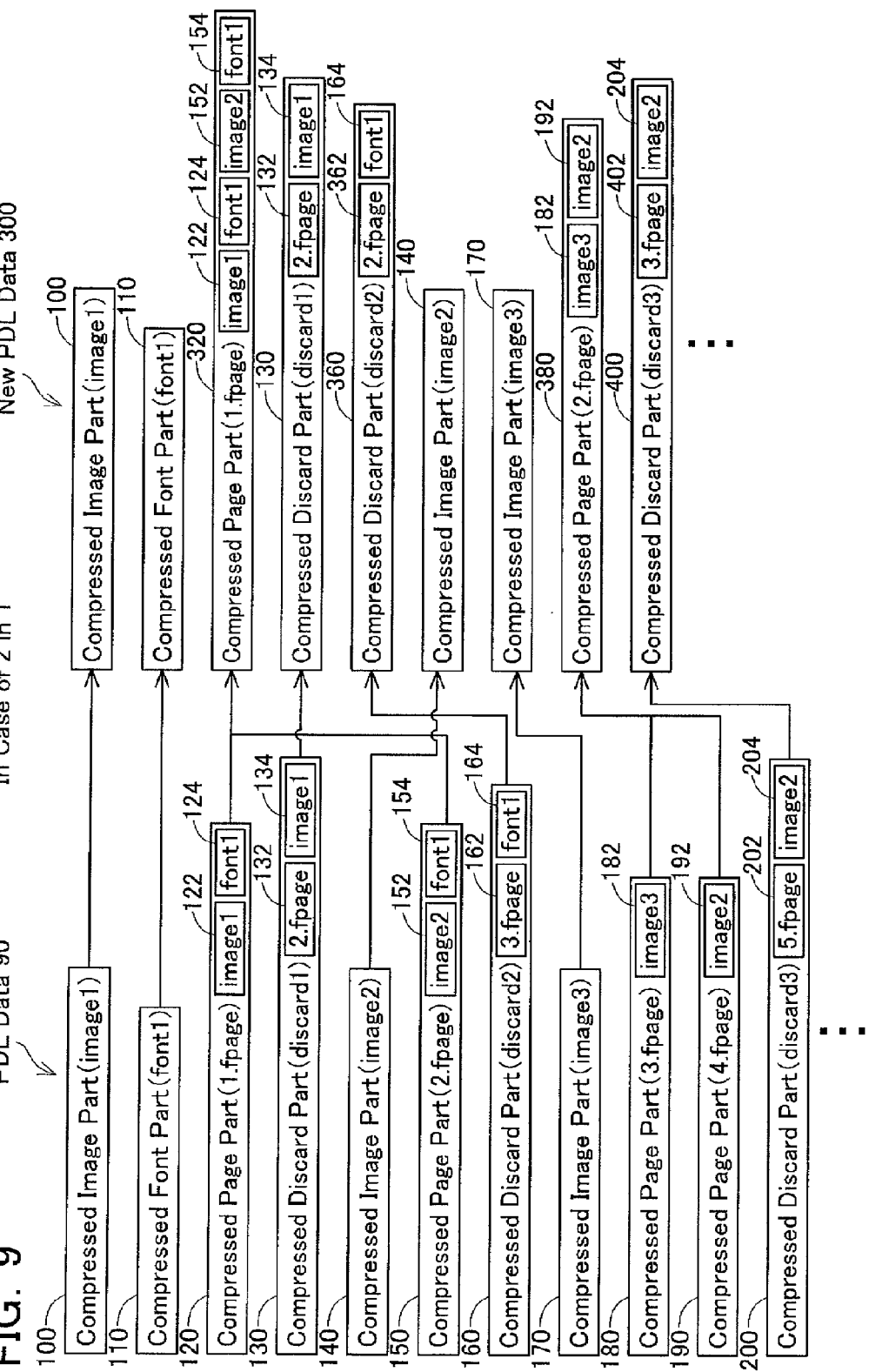

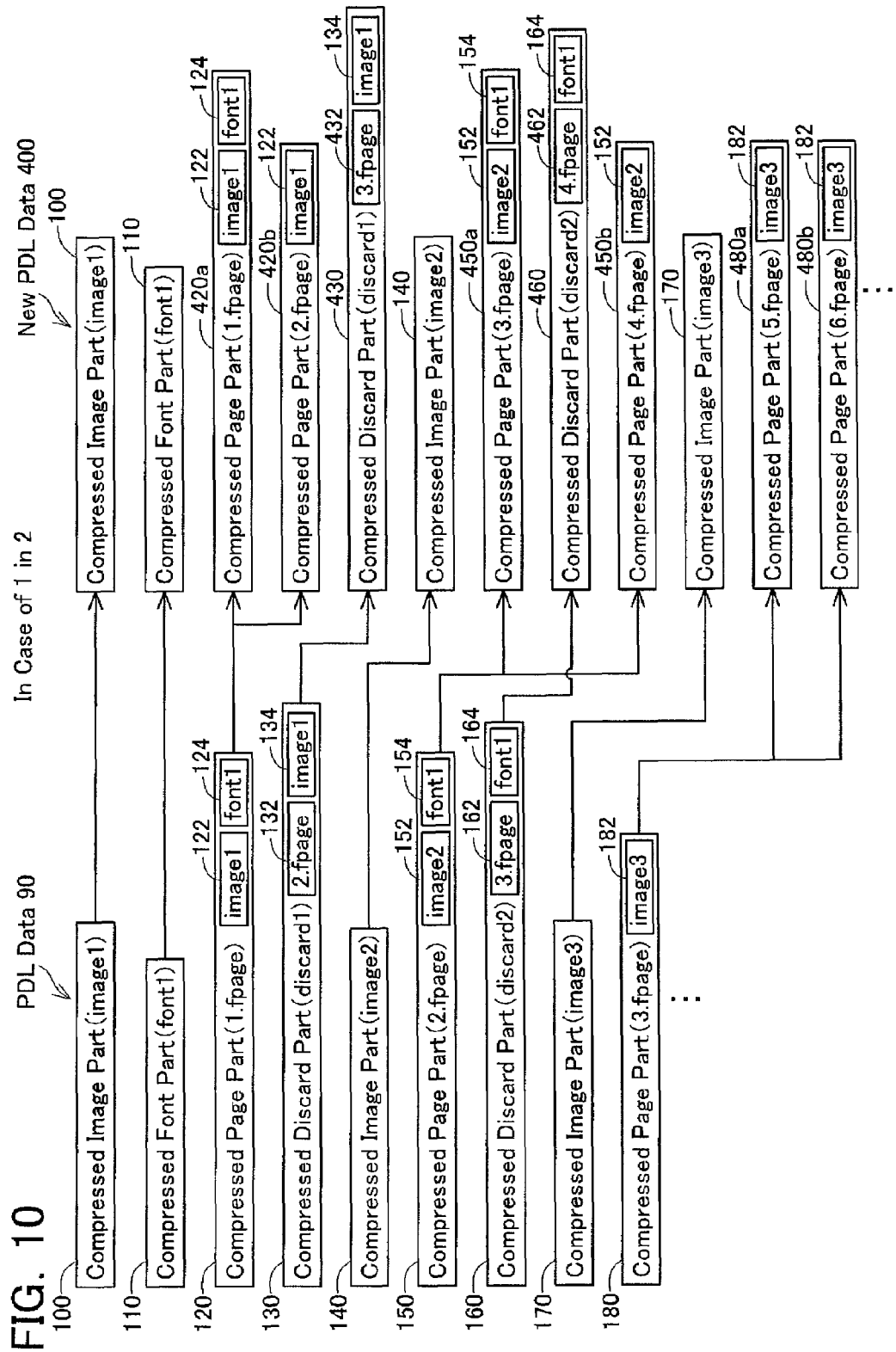

PDL DATA PROCESSING DEVICE

CROSS-REFERENCE TO RELATED APPLICATION

This application claims priority to Japanese Patent Application No. 2009-205503, filed on Sep. 7, 2009, the contents of which are hereby incorporated by reference into the present application.

TECHNICAL HELD

The present specification teaches a technique for processing PDL (Page Description Language) data.

DESCRIPTION OF RELATED ART

PDL data processing devices that create drawing data for printing from PDL data are widely known. For example, a PDL data processing device that creates drawing data from XPS (XML Paper Specification) data is known. The XPS data includes plural sets of part data such as resource part data, page part data, etc. The set of page part data includes designation information that is associated with a page number, and that designates resource part data (e.g., image resource part data, font resource part data). The PDL data processing device creates drawing data for one page utilizing a set of page part data for one page, and a set of resource part data designated by the designation information included in the page part data.

SUMMARY

It can be considered preferable to delete a set of resource part data which is, for example, unnecessary for creating drawing data of a third page onward at a timing prior to a start for a creation of drawing data of the third page. By so doing, an amount of memory used can be reduced. In order to delete the set of resource part data at the above timing, a configuration can be considered that includes a set of deletion part data in the PDL data. The set of deletion part data includes page information indicating page number (e.g., information indicating the third page), and data information indicating a target set of the resource part data of a deletion target. According to this configuration, by reading the set of deletion part data, the PDL data processing device can identify a timing at which the target set of the resource part data is to be deleted (e.g., a timing prior to the start for the creation of the drawing data of the third page), and can delete the target set of the resource part data at that timing. No such deletion part data is taught in the conventional alt.

A technique is taught in the present specification that can delete a set of resource part data at an appropriate timing.

In the PDL data, page numbers are usually provided as a prerequisite for creating drawing data for one page utilizing a set of page part data for one page (called "1 in 1" below). For example, if drawing data for ten pages is to be created, PDL data is created which includes ten sets of page part data associated with page numbers "1" to "10". The page information included in a set of deletion part data can also be expected to have page numbers provided with prerequisites of 1 in 1, and the creation of the drawing data in sequence from a first page. Consequently, in the case of 1 in 1, if a target set of the resource part data is deleted at the timing indicated by the set of deletion part data (the page information included in the deletion part data) in accordance with the page number of the drawing data that has actually been created, the target set of the resource part data can be deleted at the appropriate timing.

However, there is, for example, a case where drawing data for one page is to be created utilizing sets of page part data for N pages, N being an integer equal to two or more, (called "N in 1" below), and a case where drawing data for N pages is to be created utilizing a set of page part data for one page (called "1 in N" below). In the case of N in 1 or 1 in N, the page numbers of the drawing data that has actually been created are not the same as the page numbers associated with the page part data (i.e., page numbers indicated by the page information included in the deletion part data). Consequently, if the target set of resource part data is deleted at the timing indicated by the set of deletion part data in accordance with the page numbers of the drawing data that has actually been created, the target set of resource part data may not be deleted at the appropriate timing. For example, in the case of N in 1, a first event may occur in which a set of resource part data not needed for creating subsequent drawing data is deleted at a late timing. Further, for example, in the case of 1 in N, a second event may occur in which a set of resource part data needed for creating subsequent drawing data is deleted. In order to suppress occurrence of at least one of such events, a PDL data processing device provided with the following configuration may be adopted.

One aspect disclosed in the present specification is a PDL data processing device. The PDL data processing device may comprise a PDL data obtaining unit, a drawing data creation unit, and a deletion unit. The PDL data obtaining unit may be configured to obtain PDL data including a set of resource part data, a set of page part data, and a set of deletion part data. The set of the page part data may be associated with a page number and may include designation information designating the set of the resource part data. The set of the deletion part data may include page information indicating a page number and data information indicating the set of the resource part data. The drawing data creation unit may be configured to create drawing data by utilizing the set of the page part data and the set of the resource part data designated by the designation information included in the set of the page part data. The deletion unit may be configured to delete the set of the resource part data indicated by the data information included in the set of the deletion part data.

The deletion unit may be configured to, in a first case where the drawing data for one page is to be created utilizing sets of the page part data for N pages, or in a second case where the drawing data for N pages is to be created utilizing a set of the page part data for one page, the N being an integer equal to 2 or more, regardless of a page number M of the drawing data which has been actually created, the M being an integer equal to 1 or more, subsequent to a creation for a first set of the drawing data by utilizing a first set of the page part data being associated with a page number L, and prior to a creation for a second set of the drawing data by utilizing a second set of the page part data being associated with a page number L+1, the L being an integer equal to 1 or more, delete a first set of the resource part data indicated by a first set of the data information included in a first set of the deletion part data including a first set of the page information indicating the page number L+1.

In order to prevent occurrence of at least one of the first and second event, a PDL data processing device provided with the following configuration may be adopted. One aspect disclosed in the present specification is a PDL data processing device comprising a PDL data obtaining unit and a data creation unit. The data creation unit may be configured to create new PDL data including the set of the resource part data, a set of new page part data, and a set of new deletion part data from the PDL data, in a first case where the drawing data for one page is to be created utilizing sets of the page part data for N pages, or in a second case where the drawing data for N pages is to be created utilizing a set of the page part data for one page, the N being an integer equal to 2 or more. The data creation unit may be configured to, in the first case or the second case, create the set of the new page part data being associated with a new page number from the set of the page part data included in the PDL data such that the drawing data for one page is created utilizing a set of the new page part data for one page, and create the set of the new deletion part data by changing the page information included in the set of the deletion part data included in the PDL data into new page information determined in accordance with the new page number.

Moreover, for realizing the PDL data processing device, a control method, a computer program, and a non-transitory computer readable medium storing that computer program are also novel and have utility.

BRIEF DESCRIPTION OF DRAWINGS

FIG. 5 shows how drawing data is created in accordance with 1 in 2.
FIG. 9 shows how new PDL data is created in the case of 2 in 1.
FIG. 10 shows how new PDL data is created in the case of 1 in N.

DETAILED DESCRIPTION OF THE PREFERRED EMBODIMENT

First Embodiment

Configuration of System

Figure 1:
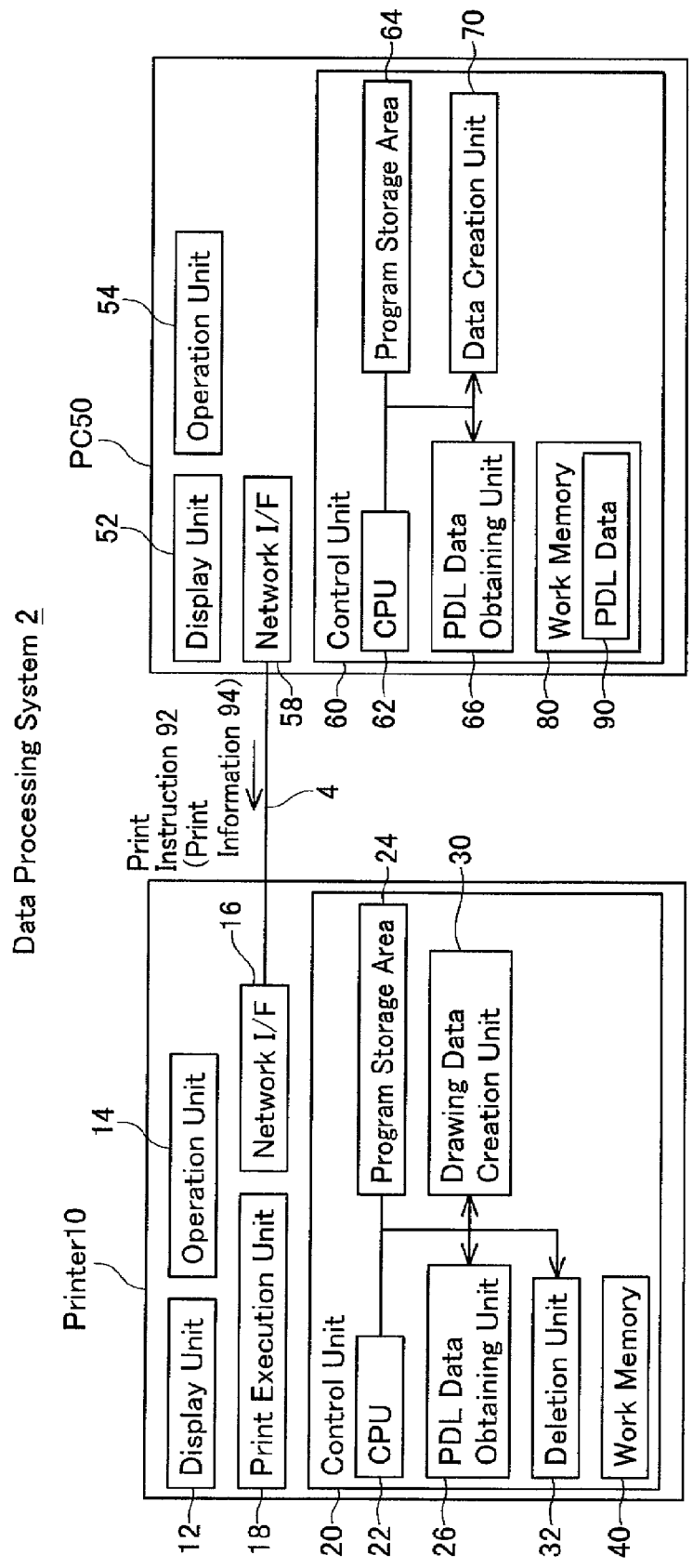
FIG. 1 shows an example of a configuration of a data processing system.

The embodiment will be explained with reference to the figures. FIG. 1 shows a schematic view of a data processing system 2 of the present embodiment. The data processing system 2 comprises a LAN 4, printer 10, and PC 50. The printer 10 and PC 50 are connected to the LAN 4. The printer 10 and the PC 50 can communicate with one another through the LAN 4.

(Configuration of the Printer 10)

The printer 10 comprises a display unit 12, operation unit 14, network interface 16, print execution unit 18, and control unit 20. The display unit 12 displays various types of information. The operation unit 14 is composed of a plurality of keys. A user can input various commands to the printer 10 by operating the operation unit 14. The printer 10 is connected with the LAN 4 through the network interface 16. The print execution unit 18 comprises a print mechanism such as ink jet type, laser type, etc. The print execution unit 18 prints an image on a print medium in accordance with drawing data supplied from the control unit 20.

The control unit 20 comprises a CPU 22 and a program storage area 24. The CPU 22 executes various processes in accordance with programs stored in the program storage area 24. The CPU 22 realizes the functions of a PDL data obtaining unit 26, drawing data creation unit 30, and deletion unit 32 by executing the programs stored in the program storage area 24. The control unit 20 further comprises a work memory 40.

(Configuration of the PC 50)

The PC 50 comprises a display unit 52, operation unit 54, network interface 58, and control unit 60. The display unit 52 displays various information. The operation unit 54 is composed of a keyboard, mouse, etc. The user can input various commands to the PC 50 by operating the operation unit 54. The PC 50 is connected to the LAN 4 through the network interface 58.

The control unit 60 comprises a CPU 62, program storage area 64, and work memory 80. The CPU 62 executes various processes in accordance with programs stored in the program storage area 64. The CPU 62 realizes the functions of a PDL data obtaining unit 66 and a data creation unit 70 by executing the programs stored in the program storage area 64. The data creation unit 70 is utilized in a second embodiment (to be described).

An application (e.g., a printer driver (not shown) of the printer 10) for sending PDL data 90 to the printer 10 is stored in the program storage area 64. The PDL data 90 of the present embodiment is XPS data. When printing is commanded by the user, data (e.g., document data) commanded to be printed is converted into the PDL data 90, and the PDL data 90 is stored in the work memory 80. The PDL data obtaining unit 66 of the PC 50 obtains the PDL data 90 stored in the work memory 80. The control unit 60 sends the PDL data 90 to the printer 10. The PDL data obtaining unit 26 of the printer 10 thereby obtains the PDL data 90.

(Configuration of the PDL Data 90)

Figure 2:
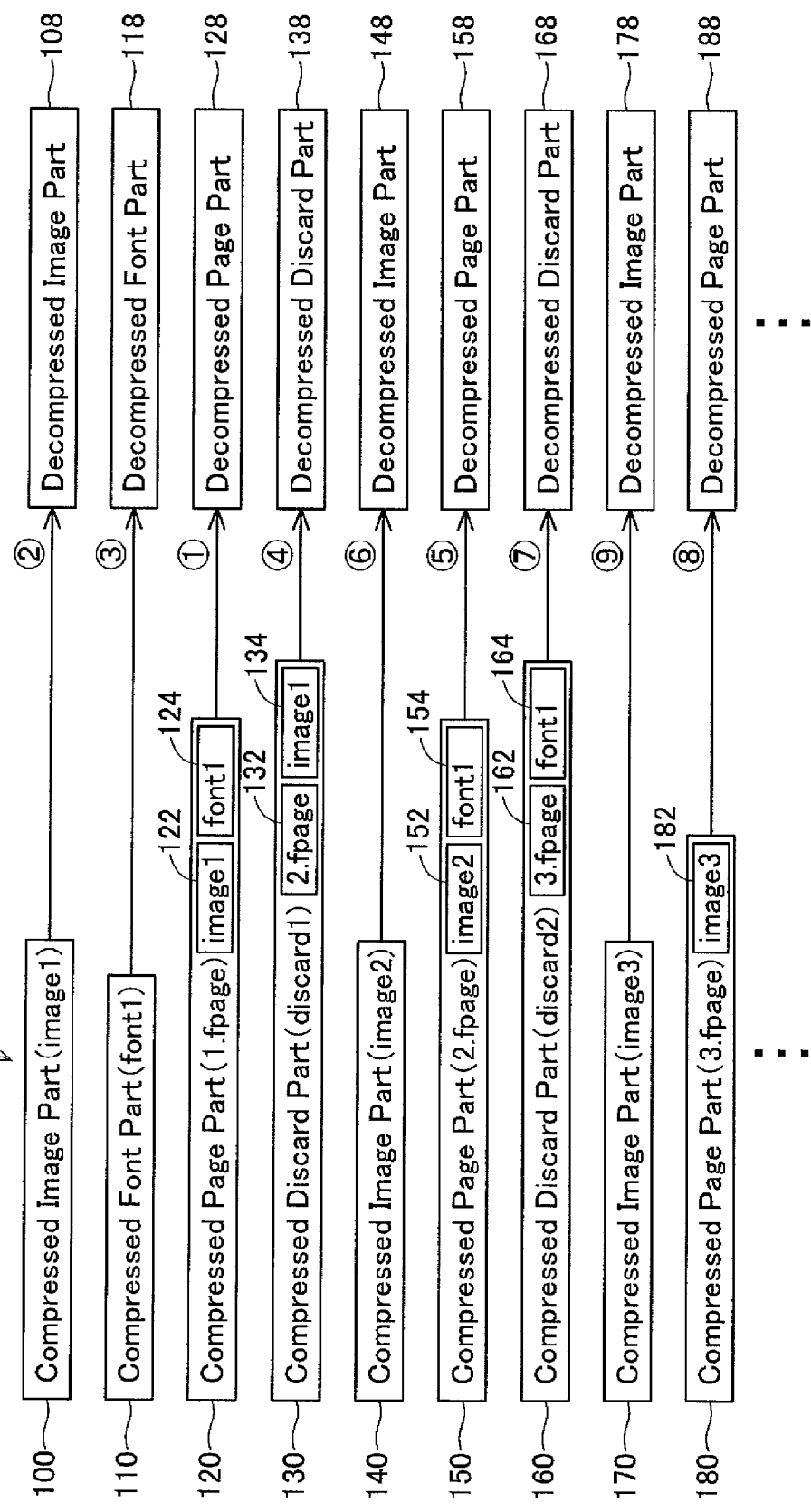
FIG. 2 shows an example of PDL data.

FIG. 2 shows an example of the PDL data 90 (XPS data) created by the PC 50. The PDL data 90 includes a plurality of compressed parts 100 to 180. The character strings inside parentheses (e.g., "image1") of the compressed parts 100 to 180 indicate file names associated with the compressed parts 100 to 180 (simplified below to "file name of compressed parts"). The file name includes an extension, but this is not shown in FIG. 2.

The compressed parts 100 to 180 are classified into a compressed resource part, a compressed page part (FixedPage), and a compressed discard part (DiscardControl). Actually, the XPS format PDL data can be further classified into other types of parts (e.g., FixedDocument). However, in the present embodiment, an explanation of other types of parts is omitted.

The compressed resource part is a set of compressed data of a resource (image, font, etc.) for creating drawing data. The compressed resource parts shown in FIG. 2 are classified into compressed image parts 100, 140, 170, and a compressed font part 110. Actually, compressed resource parts can be further classified into other types of resource parts (e.g., ICCProfile). However, in the present embodiment, an explanation of other types of resource parts is omitted.

The compressed page part is various types of data, which have been compressed, for creating drawing data for one page in accordance with 1 in 1. Each compressed page part is created from data for one page among the data whose printing was commanded by the user. For example, if the data whose printing was commanded by the user includes data for ten pages, the PDL data 90 is created to include ten compressed page parts. In the case of 1 in 1, the file name (e.g., "1.fpage") of each of the compressed page parts 120, 150, 180 indicates a page number of the drawing data created utilizing that compressed page part. For example, the file name of the compressed page part 120 is "1.fpage". In the case of 1 in 1, this indicates that the drawing data of a first page is created utilizing the compressed page part 120. Each of the compressed page parts 120, 150, 180 includes designation information 122, 124, 152, 154, 182 that designates the file name of the respective compressed resource part. For example, the compressed page part 120 of the first page includes the designation information 122 that designates the file name "image1" of the compressed image part 100. In the case of 1 in 1, this indicates that an image corresponding to the compressed image part 100 (actually a decompressed image part 108 created from the compressed image part 100) is located within the drawing data of the first page. Moreover, the compressed page part 120 of the first page includes information (not shown) designating a location where the image corresponding to the compressed image part 100 is located within the drawing data. Further, for example, the compressed page part 120 of the first page further includes the designation information 124 designating the file name "font1" of the compressed font part 110. In the case of 1 in 1, this indicates that a text described in accordance with the font corresponding to the compressed font part 110 (actually a decompressed font part 118 created from the compressed font part 110) is located within the drawing data of the first page. Moreover, the compressed page part 120 of the first page includes information (not shown) designating the text described in accordance with the font corresponding to the compressed font part 110, and a location of that text within the drawing data.

The compressed discard part is data, which has been compressed, that commands the deletion of the compressed resource part and the decompressed resource part created from that compressed resource part. Each of the compressed discard parts 130, 160 includes page information 132, 162 and data information 134, 164. The page information 132, 162 indicates page number (e.g., "2.fpage"). Further, the data information 134, 164 includes the file name (e.g., "image1") of the compressed resource part. In the case of 1 in 1, the printer 10 can execute the following processes utilizing the compressed discard part 130. The printer 10 deletes the compressed image part 100 that has the file name (image1) indicated by the data information 134 associated with the page information 132 (2.fpage) and deletes the decompressed image part 108 created from the compressed image part 100, after creation has ended of the drawing data (the drawing data of the first page) that is one page prior to the page corresponding to the page number (2.fpage) indicated by the page information 132, and before creation has started of the drawing data (the drawing data of a second page) of the page corresponding to that page number (2.fpage).

(1 in 1 Drawing Data Creation Process)

Next, an outline of the process for creating the drawing data utilizing the PDL data 90 will be described. First, the 1 in 1 drawing data creation process will be described with reference to FIGS. 2 and 3. Utilizing the operation unit 54 of the PC 50, the user can designate data (document data, etc.) that is a printing target, and can execute an operation for printing. The control unit 60 of the PC 50 thereby creates the PDL data 90 by sequentially describing a plurality of compressed parts 100, etc. in accordance with a predetermined sequence. In the present embodiment, the plurality of compressed parts 100, etc. are described in the sequence from top to bottom of FIG. 2. The user can select printing, onto one page of print medium, of the data for one page included in the printing target data. In this case, the control unit 60 of the PC 50 sends a print instruction 92 including print information 94 (FIG. 1) indicating 1 in 1 to the printer 10. Consequently, the control unit 20 of the printer 10 executes the 1 in 1 drawing data creation process. The print information 94 indicating 1 in 1 is included in the print instruction 92 in the present embodiment. However, the print information 94 may alternately be included in the PDL data 90. Upon receiving the print instruction 92 from the PC 50, the control unit 20 of the printer 10 first secures a page memory (not shown) in the work memory 40. The page memory has a capacity for storing the drawing data for one page.

The control unit 60 of the PC 50 sends the PDL data 90 to the printer 10. The PDL data 90 sent from the PC 50 is stored in a receive buffer (not shown) provided in the network interface 16 of the printer 10. The PDL data obtaining unit 26 of the printer 10 sequentially obtains the compressed parts 100, etc. of the PDL data 90 from the receive buffer, and sequentially stores the compressed parts 100, etc. in the work memory 40.

The drawing data creation unit 30 of the printer 10 first creates a decompressed page part 128 in the work memory 40 by decompressing the compressed page part 120 of the first page (1.fpage). The circled numbers "1" to "9" shown in FIG. 2 indicate the sequence of decompressing the compressed parts. Next, the drawing data creation unit 30 reads the designation information 122, 124 (FIG. 2) from the decompressed page part 128. The drawing data creation unit 30 creates the decompressed image part 108 in the work memory 40 by decompressing the compressed image part 100 designated by the designation information 122 (image1). Further, the drawing data creation unit 30 creates the decompressed font part 118 in the work memory 40 by decompressing the compressed font part 110 designated by the designation information 124 (font1).

Next, the drawing data creation unit 30 creates drawing data 210 of the first page (FIG. 3) in the page memory utilizing the decompressed page part 128 of the first page, the decompressed image part 108, and the decompressed font part 118. Specifically, the drawing data creation unit 30 writes an image corresponding to the decompressed image part 108 at a location within the page memory corresponding to location information for the image included in the decompressed page part 128. Further, the drawing data creation unit 30 creates a text ("ABC" of FIG. 3) described in accordance with the decompressed font part 118, this text being the text included in the decompressed page part 128. Next, the drawing data creation unit 30 writes the aforementioned text into a location within the page memory corresponding to location information for the text included in the decompressed page part 128. The drawing data 210 of the first page is thereby completed. The number represented by "M" of FIG. 3 indicates the page number of the drawing data that actually has been created.

Next, the deletion unit 32 creates a decompressed discard part 138 in the work memory 40 by decompressing the compressed discard part 130 (discard1). Next, the deletion unit 32 reads the page information 132 and the data information 134 from the decompressed discard part 138. As shown in FIG. 2, the page information 132 indicates "2.fpage", and the data information 134 indicates "image1". This indicates that the compressed image part 100 of the file name "image1" and the decompressed image part 108 created from the compressed image part 100 can be deleted after creation has ended of the drawing data 210 of the first page (FIG. 3) and before creation has started of drawing data 212 of the second page. The deletion unit 32 deletes the compressed image part 100 and decompressed image part 108 from the work memory 40 at a timing T1 of FIG. 3. The work memory 40 is thereby released (freed).

Next, the control unit 20 supplies the drawing data 210 of the first page to the print execution unit 18 (FIG. 1). Consequently, the print execution unit 18 prints on one piece of print medium in accordance with the drawing data 210 of the first page. After having supplied the drawing data 210 of the first page to the print execution unit 18, the control unit 20 clears the drawing data 210 written in the page memory. When the drawing data of the second and subsequent pages are completed, as well, the control unit 20 supplies the drawing data to the print execution unit 18. A description of this supply process is omitted below. As is clear from the above description, the timing T1 of the present embodiment is a timing after creation of the drawing data 210 of the first page has ended and before the drawing data 210 of the first page begins to be printed.

Next, the drawing data creation unit 30 creates a decompressed page part 158 in the work memory 40 by decompressing the compressed page part 150 of the second page (2.fpage). Next, the drawing data creation unit 30 creates a decompressed image part 148 in the work memory 40 by decompressing the compressed image part 140 designated by the designation information 152 (image2) included in the decompressed page part 158. Here, the drawing data creation unit 30 does not decompress the compressed font part 110 (font1) designated by the designation information 154. This is because the compressed font part 110 has already been decompressed when the drawing data 210 of the first page was created. Next, the drawing data creation unit 30 writes an image corresponding to the decompressed image part 148 to a location in the page memory corresponding to location information for the image included in the decompressed page part 158. Further, the drawing data creation unit 30 creates a text ("DEF" of FIG. 3) described in accordance with the decompressed font part 118, this text being the text included in the decompressed page part 158. Next, the drawing data creation unit 30 writes the aforementioned text in a location in the page memory corresponding to location information for the text included in the decompressed page part 158. The drawing data 212 of the second page is thereby completed.

The deletion unit 32 creates a decompressed discard part 168 in the work memory 40 by decompressing the compressed discard part 160 (discard2). As shown in FIG. 2, the page information 162 indicates "3.fpage," and the data information 164 indicates "font1" in the decompressed discard part 168. This indicates that the compressed font part 110 of the file name "font1" and the decompressed font part 118 created from the compressed font part 110 can be deleted after creation has ended of the drawing data 212 of the second page and before creation has started of drawing data 214 of a third page. The deletion unit 32 deletes the compressed font part 110 and decompressed font part 118 from the work memory 40 at a timing T2 of FIG. 3.

Next, the drawing data creation unit 30 creates a decompressed page part 188 in the work memory 40 by decompressing the compressed page part 180 of the third page (3.fpage). Next, the drawing data creation unit 30 creates a decompressed image part 178 in the work memory 40 by decompressing a compressed image part 170 designated by designation information 182 (image3) included in the decompressed page part 188. The drawing data creation unit 30 writes an image corresponding to the decompressed image part 178 to a location in the page memory corresponding to location information for the image included in the decompressed page part 188. The drawing data 214 of the third page is thereby completed.

(2 in 1 Drawing Data Creation Process)

Figure 4:
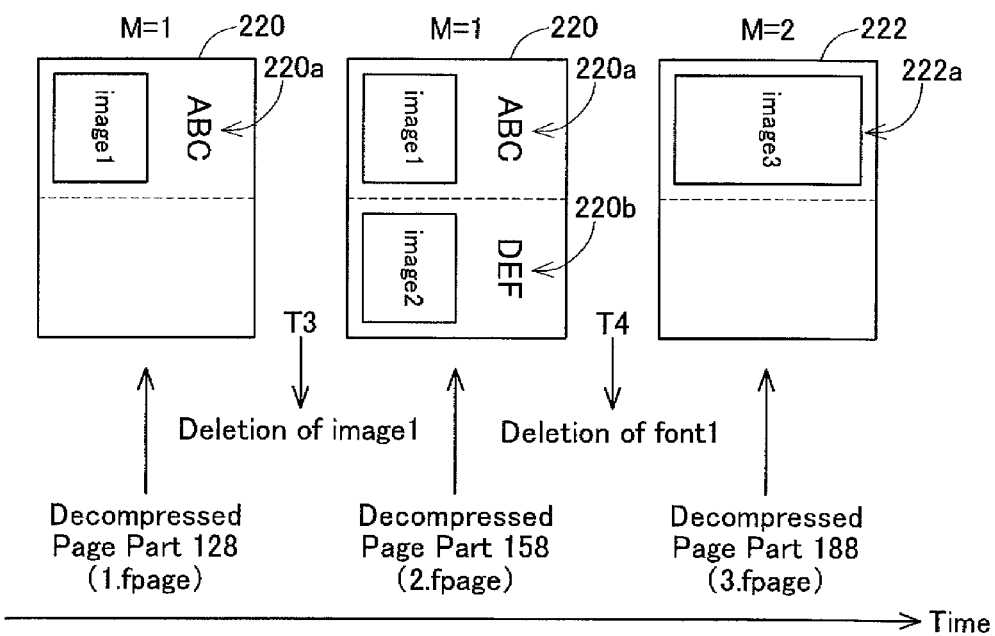
FIG. 4 shows how drawing data is created in accordance with 2 in 1.

Next, the 2 in 1 drawing data creation process will be described with reference to FIG. 4. Utilizing the operation unit 54 of the PC 50, the user can select printing on one page of print medium in accordance with data for two pages included in the printing target data. In this case, the control unit 60 of the PC 50 sends the print instruction 92 including the print information 94 (FIG. 1) indicating 2 in 1 to the printer 10. Consequently, the control unit 20 of the printer 10 executes the 2 in 1 drawing data creation process.

Similar to the case of the 1 in 1 drawing data creation process, the drawing data creation unit 30 decompresses the compressed parts 120, 100, 110 in sequence in accordance with the circled sequence "1" to "3" shown in FIG. 2. As described above, the location information for the image (image1) and the location information for the text (ABC) are included in the decompressed page part 128. These locations are the locations of the case of 1 in 1. The drawing data creation unit 30 converts the locations of the case of 1 in 1 to locations of the case of 2 in 1. As is clear from comparing FIGS. 3 and 4, drawing data 220 for one page in the case of 2 in 1 includes data corresponding to the drawing data 210, 212 for two pages of the case of 1 in 1. In order to create this type of drawing data 220, the drawing data creation unit 30 converts the location information for the image and the location information for the text includes in the decompressed page part 128 to locations of the case of 2 in 1. Since this type of location conversion process is commonly known, a detailed description thereof is omitted here. The drawing data creation unit 30 writes an image corresponding to the decompressed image part 108 (image1) into a location within the page memory corresponding to the converted location for the image. Further, the drawing data creation unit 30 writes the text (ABC) described in accordance with the decompressed font part 118 (font1) into a location within the page memory corresponding to the converted location for the text. Drawing data 220a of the upper half among the drawing data 220 of the first page is thereby completed.

Next, the deletion unit 32 deletes the compressed image part 100 and decompressed image part 108 from the work memory 40 in accordance with the decompressed discard part 138 created from the compressed discard part 130 (discard1). The resource parts 100, 108 are thereby deleted after creation has ended of the drawing data 220a of the upper half of the drawing data 220 of the first page, and before creation has started of drawing data 220b of the lower half thereof. That is, the resource parts 100, 108 are deleted at a timing T3.

Next, the drawing data creation unit 30 decompresses the compressed parts 150, 140 in sequence in accordance with the circled sequence "5" to "6" shown in FIG. 2. Next, the drawing data creation unit 30 converts the location information for the image (image2) and the location information for the text (DEF) included in the decompressed page part 158 (2.fpage) to locations of the case of 2 in 1. The drawing data creation unit 30 writes an image corresponding to the decompressed image part 148 (image2) into a location within the page memory corresponding to the converted location for the image. Further, the drawing data creation unit 30 writes the text (DEF) described in accordance with the decompressed font part 118 (font1) into a location within the page memory corresponding to the converted location for the text. The drawing data 220b of the lower half among the drawing data 220 of the first page is thereby completed. As a result, the drawing data 220 of the first page is completed.

Next, the deletion unit 32 deletes the compressed font part 110 and decompressed font part 118 from the work memory 40 in accordance with the decompressed discard part 168 created from the compressed discard part 160 (discard2). The resource parts 110, 118 are thereby deleted after creation has ended of the drawing data 220 of the first page, and before creation has started of drawing data 222 of the second page. That is, the resource parts 110, 118 are deleted at a timing T4. Next, the control unit 20 supplies the drawing data 220 of the first page to the print execution unit 18. Consequently, the print execution unit 18 prints a first page of print medium in accordance with the drawing data 220 of the first page. A description of supplying the drawing data for one page to the print execution unit 18 after completion of the drawing data therefor is omitted below.

Next, the drawing data creation unit 30 decompresses the compressed parts 180, 170 in sequence in accordance with the circled sequence "8" to "9" shown in FIG. 2. Next, the drawing data creation unit 30 converts the location information for the image (image3) included in the decompressed page part 188 (3.fpage) to a location of the case of 2 in 1. The drawing data creation unit 30 writes an image corresponding to the decompressed image part 178 (image3) into a location within the page memory corresponding to the converted location of the image. Drawing data 222a of the upper half among the drawing data 222 of the second page is thereby completed. If a subsequent compressed page part (4.fpage) exists in the PDL data 90, drawing data of the lower half among the drawing data 220 of the second page is created by using the same method. Further, if a subsequent compressed page part does not exist in the PDL data 90, the drawing data 222 of the second page is completed at the point when the drawing data 222a of the upper half is completed.

If processing is executed with the page information 132, 162 included in the compressed discard parts 130, 160 (the decompressed discard parts 138, 168) corresponding to the page numbers "M" of the drawing data 220, 222 which have actually been created, the following event occurs. The compressed image part 100 and the decompressed image part 108 (image1) are deleted after creation has ended of the drawing data 220 of the first page, and before creation has started of the drawing data 222 of the second page (i.e., at the timing T4). In this case, the resource parts 100, 108 (image1), which are not needed after the timing T3, are deleted at the timing T4, which is later than the timing T3. Further, the compressed font part 110 and the decompressed font part 118 (font 1) are deleted after creation has ended of the drawing data 222 of the second page, and before creation has started of the drawing data of the third page. In this case, the resource parts 110, 118 (font1), which are not needed after the timing T4, are deleted at a timing later than the timing T4. That is, the timing at which unnecessary resource parts are deleted is delayed, and the work memory 40 cannot be released (freed) promptly. To deal with this, regardless of the page numbers "M" of the drawing data 220, 222 which have actually been created, the deletion unit 32 of the present embodiment executes a process presuming that the page information 132, 162 included in the compressed discard parts 130, 160 corresponds to the page numbers indicated by the file names of the compressed page parts 120, 150, 180 actually utilized in creating the drawing data 220a, 220b, 222a. Consequently, the resource parts 100, 108 of "image1" can be deleted at the appropriate timing T3 indicated by the compressed discard part 130, and the resource parts 110, 118 of "font1" can be deleted at the appropriate timing T4 indicated by the compressed discard part 160. Consequently, the work memory 40 can be released promptly.

(1 in 2 Drawing Data Creation Process)

Next, the 1 in 2 drawing data creation process will be described with reference to FIG. 5. Utilizing the operation unit 54 of the PC 50, the user can select printing on two pages of print medium in accordance with data for one page included in the printing target data. In this case, the control unit 60 of the PC 50 sends the print instruction 92 including the print information 94 (FIG. 1) indicating 1 in 2 to the printer 10. Consequently, the control unit 20 of the printer 10 executes the 1 in 2 drawing data creation process.

The drawing data creation unit 30 decompresses the compressed parts 120, 100, 110 in sequence in accordance with the circled sequence "1" to "3" shown in FIG. 2. As is clear from comparing FIGS. 3 and 5, drawing data 230, 232 for two pages of the case of 1 in 2 includes data corresponding to the drawing data 210 for one page of the case of 1 in 1. In order to create this type of drawing data, the drawing data creation unit 30 converts the location information for the image (image1) and the location information for the text (ABC) included in the decompressed page part 128 (1.fpage) to locations in the drawing data 230 of the first page of the case of 1 in 2. The drawing data creation unit 30 writes an image corresponding to the decompressed image part 108 (image1) into a location within the page memory corresponding to the converted location for the image. The drawing data creation unit 30 writes only a part of the image corresponding to the decompressed image part 108 into the page memory. The drawing data creation unit 30 writes the text (ABC) described in accordance with the decompressed font part 118 into a location within the page memory corresponding to the converted location of the text. The drawing data 230 of the first page is thereby completed. The resource parts are not deleted at a timing T5 when creation of the drawing data 230 of the first page has ended.

Next, the drawing data creation unit 30 converts the location information of the image (image1) included in the decompressed page part 128 (1.fpage) to a location in the drawing data 232 of the second page of the case of 1 in 2. The drawing data creation unit 30 writes the image corresponding to the decompressed image part 108 (image1) into a location within the page memory corresponding to the converted location for the image. At this time, the drawing data creation unit 30 writes, into the page memory, only a remaining part of the image corresponding to the decompressed image part 108 (a part which was not utilized for creating the drawing data 230 of the first page). The drawing data 232 of the second page is thereby completed.

Next, the deletion unit 32 deletes the compressed image part 100 and decompressed image part 108 from the work memory 40 in accordance with the decompressed discard part 138 created from the compressed discard part 130 (discard1). The resource parts 100, 108 are thereby deleted after creation has ended of the drawing data 232 of the second page, and before creation has started of drawing data 234 of the third page. That is, the resource parts 100, 108 are deleted at a timing T6.

Similar to the case of creating the drawing data 230, 232 of the first page and second page, the drawing data creation unit 30 creates drawing data 236, 238 of the third page and fourth page in sequence utilizing the decompressed page part 158 (2.fpage), the decompressed font part 118 (font1), and the decompressed image part 148 (image2). The resource parts are not deleted at a timing T7 when creation of the drawing data 234 of the third page has ended. Next, the deletion unit 32 deletes the compressed font part 110 and decompressed font part 118 (font1) from the work memory 40 in accordance with the decompressed discard part 168 created from the compressed discard part 160 (discard2). The resource parts 110, 118 are thereby deleted after creation has ended of the drawing data 236 of the fourth page, and before creation has started of the drawing data 238 of a fifth page. That is, the resource parts 110, 118 are deleted at a timing T8.

Next, the drawing data creation unit 30 creates the drawing data 238, 240 of the fifth page and sixth page in sequence utilizing the decompressed page part 188 (3.fpage) and the decompressed image part 178 (image3). Moreover, the resource parts are not deleted at a timing T9 when creation of the drawing data 238 of the fifth page has ended.

If processing is executed presuming that the page information 132, 162, included in the compressed discard parts 130, 160 (the decompressed discard parts 138, 168), corresponds to the page numbers "M" of the drawing data 230 to 240 which have actually been created, the following event occurs. The resource parts 100, 108 (image1) are deleted after creation has ended of the drawing data 230 of the first page, and before creation has started of the drawing data 232 of the second page (i.e., at the timing T5). In this case, the resource parts 100, 108 of "image1" which are needed for creating the drawing data 232 of the second page are deleted before creation has started of the drawing data 232 of the second page. Further, the resource parts 110, 118 (font1) are deleted after creation has ended of the drawing data 232 of the second page, and before creation has started of the drawing data 234 of the third page. In this case, the resource parts 110, 118 of "font1" which are needed for creating the drawing data 234 of the third page (specifically, the text "DEF") are deleted before creation has started of the drawing data 234 of the third page. That is, the set of the resource part data, which is needed for creating subsequent drawing data, is deleted. To deal with this, regardless of the page numbers "M" of the drawing data 230 to 240 which have actually been created, the deletion unit 32 of the present embodiment executes processing presuming that the page information 132, 162, included in the compressed discard parts 130, 160, corresponds to the page numbers indicated by the file names of the page parts 120, 150, 180 actually utilized in creating the drawing data 230 to 240. Consequently, the resource parts 100, 108 of "image1" can be deleted at the appropriate timing T6 indicated by the compressed discard part 130, and the resource parts 110, 118 of "font1" can be deleted at the appropriate timing T8 indicated by the compressed discard part 160.

(1 in 1 Process)

Figure 3:
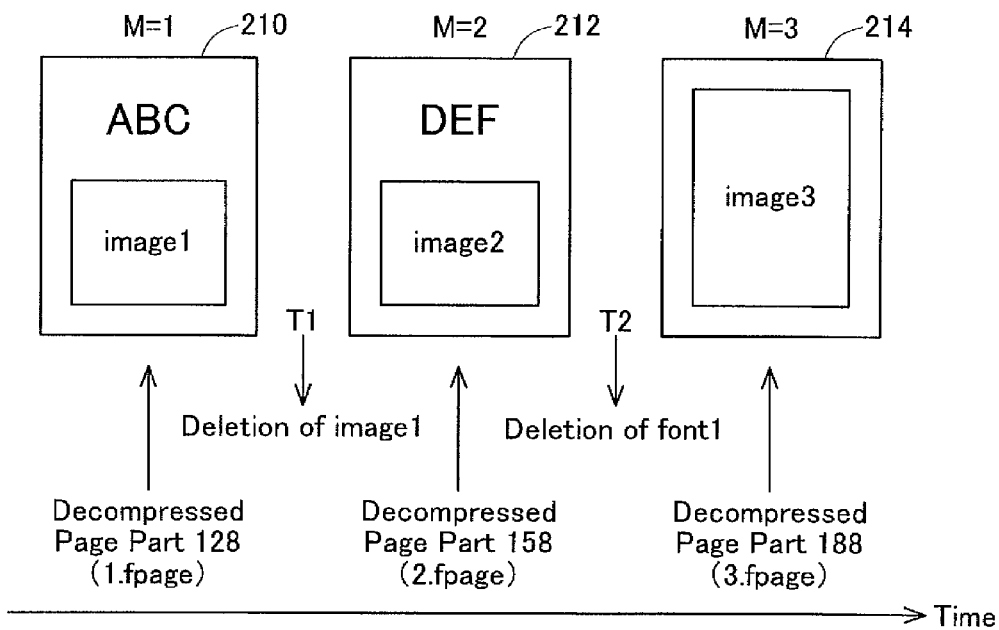
FIG. 3 shows how drawing data is created in accordance with 1 in 1.
Figure 6:
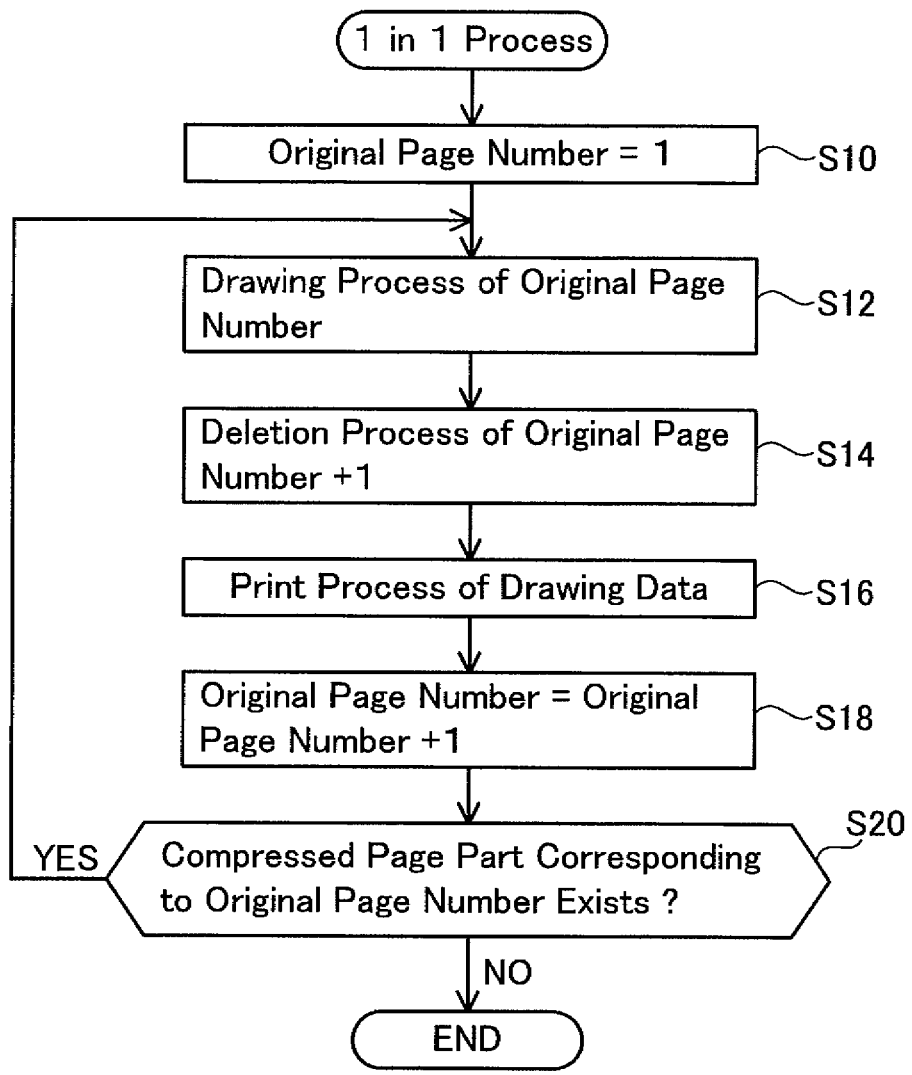
FIG. 6 shows a flowchart of a 1 in 1 process.

Next, the contents of a process executed by the control unit 20 will be explained in detail. FIG. 6 shows a flowchart of the 1 in 1 process executed by the control unit 20. The control unit 20 executes the 1 in 1 process upon receiving the print instruction 92 including the print information 94 indicating 1 in 1 from the PC 50. The 1 in 1 drawing data creation process explained utilizing FIG. 3 is realized by the control unit 20 executing the process in accordance with the flowchart of FIG. 6. The process of the PDL data obtaining unit 26 obtaining the PDL data 90 from the PC 50 is not shown in the flowcharts of FIGS. 6 to 8.

The drawing data creation unit 30 first specifies "1" as an original page number (S10). Next, the drawing data creation unit 30 executes a drawing process of the current original page number (S12). Specifically, the drawing data creation unit 30 creates a specific decompressed page part (e.g., 128 of FIG. 2) by decompressing a compressed page part (e.g., 120 of FIG. 2) having as its file name a page number (e.g., "1.fpage") corresponding to the current original page number (e.g., "1"). Next, the drawing data creation unit 30 obtains designation information (e.g., 122, 124 of FIG. 2) from the specific decompressed page part (e.g., 128 of FIG. 2), and creates a specific decompressed resource part (e.g., 108, 118 of FIG. 2) by decompressing a compressed resource part (e.g., 100, 110 of FIG. 2) designated by the designation information. The drawing data creation unit 30 creates the drawing data for one page (e.g., 210 of FIG. 3) utilizing the specific decompressed page part (e.g., 128 of FIG. 2) and the specific decompressed resource part (e.g., 108, 118 of FIG. 2).

Next, the deletion unit 32 executes a deletion process of the current original page number+1 (S14). Specifically, the deletion unit 32 calculates a specific page number (e.g., "2") by adding "1" to the current original page number. Next, the deletion unit 32 specifies all the compressed discard parts (e.g., 130 of FIG. 2) that are prior (upwards in FIG. 2) to the compressed page part (e.g., 150 of FIG. 2) having a page number (e.g., "2.fpage") corresponding to the specific page number (e.g., "2") as its file name. Next, the deletion unit 32 decompresses a compressed discard part which has not yet been decompressed among all the specified compressed discard parts. Next, the deletion unit 32 specifies specific decompressed discard part (e.g., 138 of FIG. 2) that includes the page information (e.g., 132 of FIG. 2) indicating the page number (e.g., "2.fpage") corresponding to the specific page number (e.g., "2") from among all the decompressed discard parts (e.g., 138 of FIG. 2) currently being stored in the work memory 40. Next, the deletion unit 32 deletes, from the work memory 40, the compressed resource part (e.g., 100 of FIG. 2) indicated by the data information (e.g., 134 of FIG. 2) included in the specific decompressed discard part (e.g., 138 of FIG. 2), and the decompressed resource part (e.g., 108 of FIG. 2) created from the compressed resource parts.

Next, the control unit 20 supplies the drawing data for one page created in S12 (e.g., 210 of FIG. 3) to the print execution unit 18 (S16). The print execution unit 18 thereby prints one page of print medium in accordance with the drawing data for one page. Next, the control unit 20 calculates a new original page number (e.g., "2") by adding "1" to the current original page number (e.g., "1") (S18). Next, the control unit 20 determines whether a compressed page part having as its file name a page number corresponding to the current original page number (the new original page number calculated in S18) exists in the PDL data 90 (S20). In a case of NO in S20, the 1 in 1 process ends. In a case of YES in S20, the control unit 20 executes the processes from S12 onwards.

(N in 1 Process)

Figure 7:
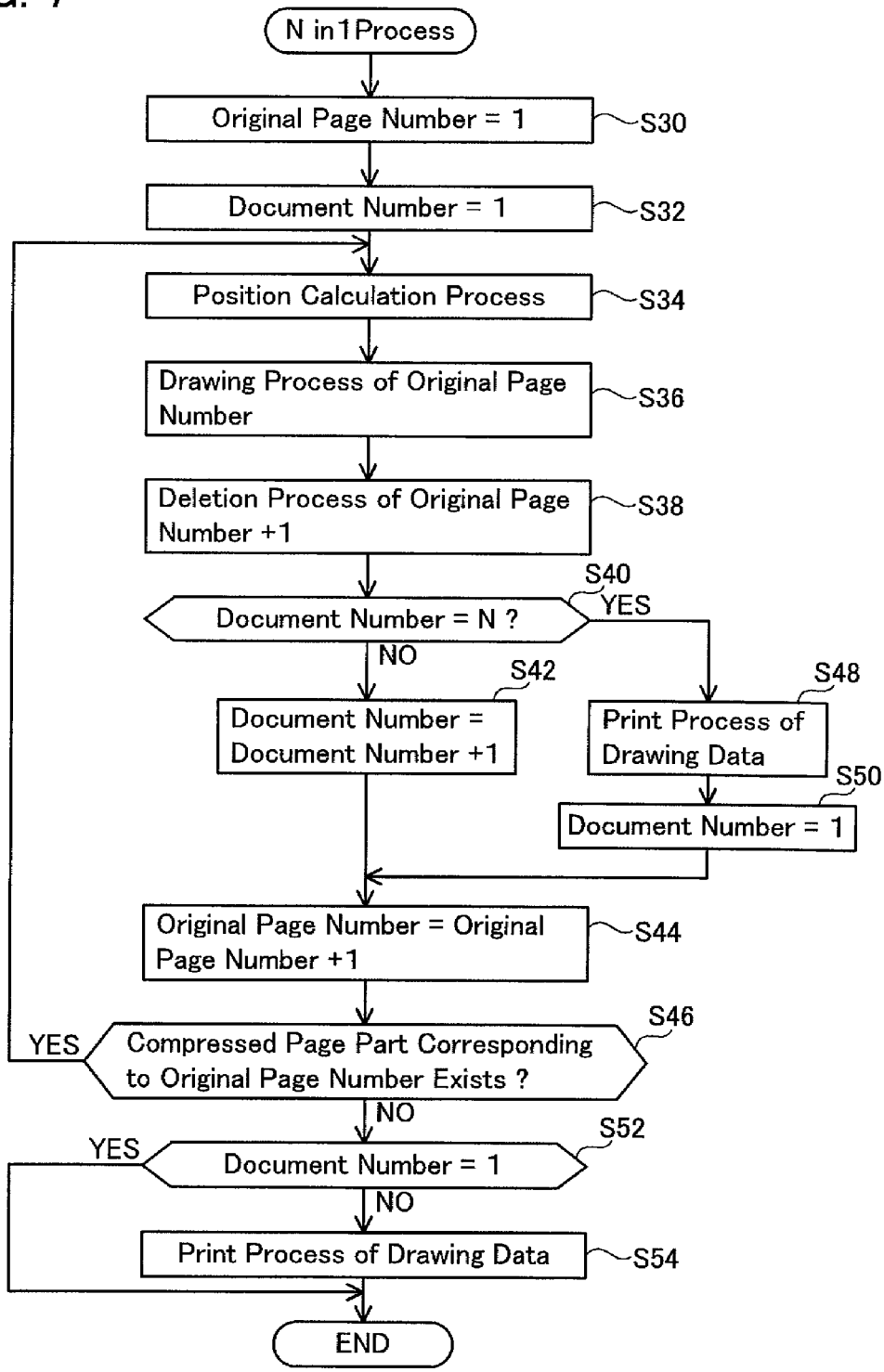
FIG. 7 shows a flowchart of an N in 1 process.

FIG. 7 shows a flowchart of the N in 1 process; "N" is an integer equal to 2 or more. FIG. 7 shows a flowchart of a process for creating drawing data for one page utilizing N sets of compressed page part data. Upon receiving the print instruction 92 including the print information 94 indicating N in 1 from the PC 50, the control unit 20 executes the N in 1 process. The drawing data creation process of the case of 2 in 1 described utilizing FIG. 4 is realized by the control unit 20 executing the process in accordance with the flowchart of FIG. 7.

The control unit 20 first specifies "1" as the original page number (S30), and specifies "1" as a document number (S32). Next, the drawing data creation unit 30 executes a position calculation process (S34). Specifically, the drawing data creation unit 30 creates a specific decompressed page part by decompressing a compressed page part having as its file name a page number corresponding to the current original page number. Next, the drawing data creation unit 30 converts location information for the resource (image, text, etc.) included in the specific decompressed page part to a location of the case of N in 1.

Next, similar to the process S12 of FIG. 6, the drawing data creation unit 30 executes the drawing process of the current original page number (S36). As described above, a compressed page part having as its file name the page number corresponding to the current original page number is decompressed in S34. Consequently, unlike the process S12 of FIG. 6, the decompression process of the compressed page part is not executed in S36. Further, in the process S36, the resources (image, text) are positioned in accordance with the converted location obtained in S34. By executing the process S36, as shown e.g. in FIG. 4, a part of the drawing data (e.g., 220a) of among drawing data for one page (e.g., 220) is created. Next, similar to the process S14 of FIG. 6, the deletion unit 32 executes the deletion process of the current original page number+1 (S38).

Next, the control unit 20 determines whether the current document number is "N" (S40). In a case of NO, the control unit 20 calculates a new document number (e.g., "2") by adding "1" to the current document number (e.g., "1") (S42). Further, the control unit 20 calculates a new original page number (e.g., "2") by adding "1" to the current original page number (e.g., "1") (S44). Next, similar to the process S20 of FIG. 6, the control unit 20 determines whether a compressed page part having as its file name a page number corresponding to the current original page number (the new original page number calculated in S44) exists in the PDL data 90 (S46). In a case of YES, the control unit 20 re-executes the processes from S34 onwards. As is clear from the above description, the processes from S34 onwards are repeated until the drawing data for one page is created utilizing the N sets of compressed page part data.

By contrast, in a case of YES in S40, similar to the process S16 of FIG. 6, the control unit 20 executes a print process of the drawing data (S48). Next, the control unit 20 specifies "1" as the document number (S50). Upon ending S50, the control unit 20 proceeds to S44.

In a case of NO in S46, the control unit 20 determines whether the current document number is "1" (S52). For example, in a case where "N" is 2, and an odd number of compressed page parts is included in the PDL data 90, the drawing data of a final page created in S36 is not created utilizing two sets of compressed page data, but utilizing one set of compressed page data. In this case, the document number is "1" at the point when S40 is executed, and NO is determined in S40. Consequently, the print process of S48 is not executed. In this type of situation, in order to print the drawing data of the final page, the control unit 20 executes the print process of the drawing data of the final page in a case of NO in S52 (S54). In a case of YES in S52, or in a case S54 has been ended, the N in 1 process ends.

(1 in N Process)

Figure 8:
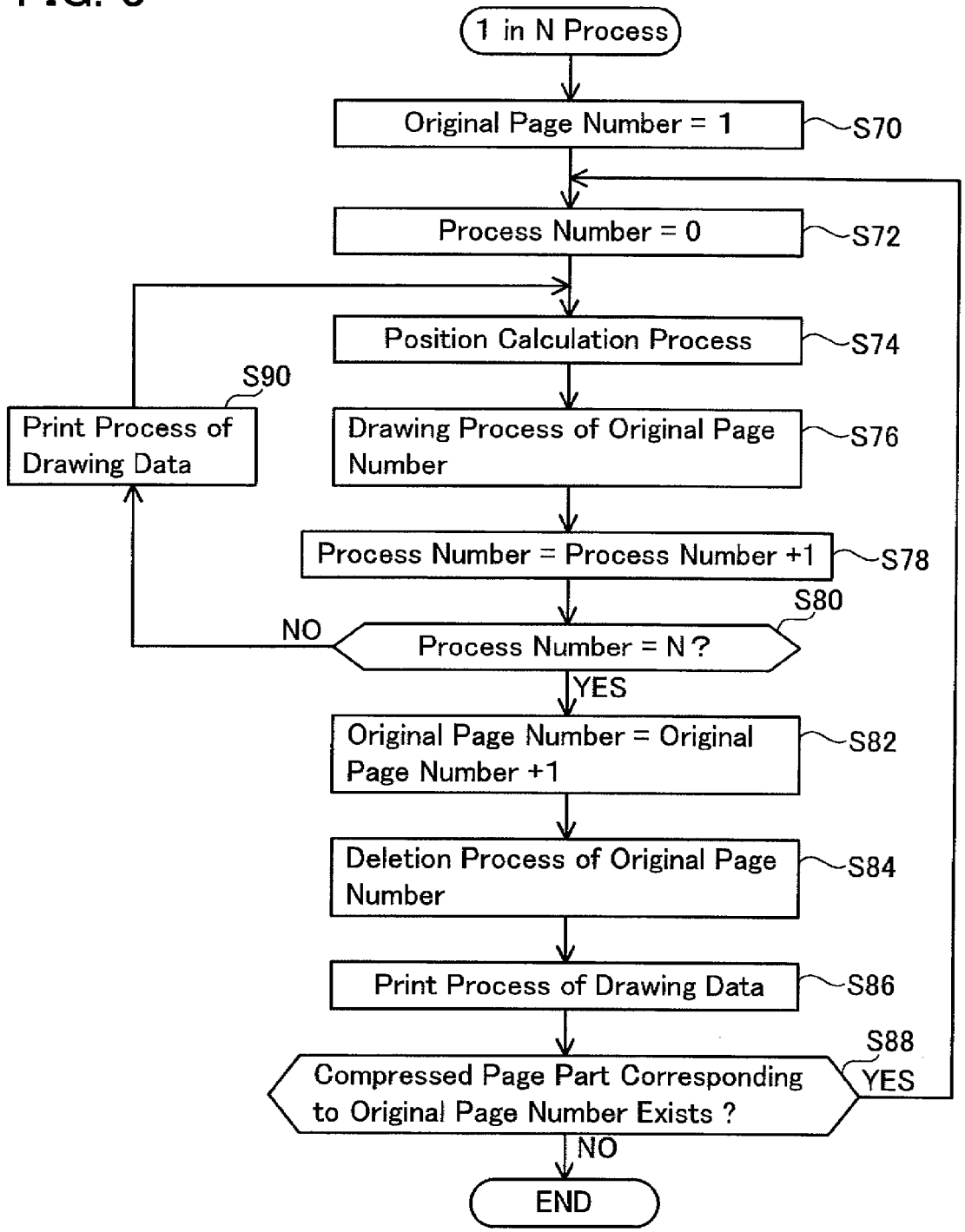
FIG. 8 shows a flowchart of a 1 in N process.

FIG. 8 shows a flowchart of the 1 in N process. FIG. 8 shows a flowchart of a process for creating drawing data for N pages utilizing one set of compressed page part data. Upon receiving the print instruction 92 including the print information 94 indicating 1 in N from the PC 50, the control unit 20 executes the 1 in N process. Moreover, the drawing data creation process of the case of 1 in 2 described utilizing FIG. 5 is realized by the control unit 20 executing the process in accordance with the flowchart of FIG. 8.

The control unit 20 first specifies "1" as the original page number (S70), and specifies "0" as a process number (S72). Next, the drawing data creation unit 30 executes a position calculation process (S74). That is, similar to the case of S34 of FIG. 7, the drawing data creation unit 30 creates a specific decompressed page part, and converts location information in the case of 1 in 1 for the resource (image, text, etc.) included in the specific decompressed page part to a location of the case of 1 in N. Next, similar to the process S36 of FIG. 7, the drawing data creation unit 30 executes a drawing process of the current original page number (S76). By executing the process S76, drawing data (e.g., 230) for one page is created, as shown e.g. in FIG. 5.

Next, the control unit 20 calculates a new process number (e.g., "1") by adding "1" to the current process number (e.g., "0") (S78). Next, the control unit 20 determines whether the current process number (the new process number calculated in S78) is "N" (S80). In a case of NO, similar to the process S16 of FIG. 6, the control unit 20 executes the print process of the drawing data (S90), and returns to S74.

By contrast, in a case of YES in S80, the control unit 20 calculates a new original page number (e.g., "2") by adding "1" to the current original page number (e.g., "1") (S82). Next, the deletion unit 32 executes the deletion process of the current original page number (the new original page number calculated in S82) (S84). Moreover, in the deletion processes S14 of FIG. 6 and S38 of FIG. 7, the current original page number+1 is utilized. However, the current original page number is utilized in the deletion process S84. Apart from this point, the deletion process S84 is the same as the deletion processes S14 of FIG. 6 and S38 of FIG. 7. Next, similar to the process S16 of FIG. 6, the drawing data creation unit 30 executes the print process of the drawing data (S86). Then, similar to the process S20 of FIG. 6, the control unit 20 determines whether a compressed page part having as its file name a page number corresponding to the current original page number (the new original page number calculated in S82) exists in the PDL data 90 (S88). In a case of YES in S88, the control unit 20 returns to S72. In a case of NO in S88, the 1 in N process ends.

The relationship between the configurations of the first embodiment and the elements of the present specification will be described. In the case of 2 in 1 of FIG. 4, the drawing data 220a and the drawing data 220b correspond respectively to "first drawing data" and "second drawing data" (first relationship). In the case of 1 in 2 of FIG. 5, the drawing data 232 and the drawing data 234 correspond respectively to the "first drawing data" and "second drawing data" (second relationship). In the first and second relationships, the compressed page part 120 is an example of "first page part data", the compressed page part 150 is an example of "second page part data", the compressed discard part 130 is an example of "first deletion part data", and the compressed image part 100 is an example of "first resource part data". In the case of 2 in 1 of FIG. 4, the drawing data 220b and the drawing data 222a can also be considered to correspond respectively to the "first drawing data" and "second drawing data". In the case of 1 in 2 of FIG. 5 the drawing data 236 and the drawing data 238 can also be considered to correspond respectively to the "first drawing data" and "second drawing data".

In the case of 1 in 1 of FIG. 3, the drawing data 210 and the drawing data 212 correspond respectively to "third drawing data" and "fourth drawing data". In this case, the compressed page part 120 is an example of "third page part data", the compressed page part 150 is an example of "fourth page part data", the compressed discard part 130 is an example of "second deletion part data", and the compressed image part 100 is an example of "second resource part data". In the case of 1 in 1 of FIG. 3, the drawing data 212 and the drawing data 214 can also be considered to correspond respectively to the "third drawing data" and "fourth drawing data".

Second Embodiment

Next, the second embodiment will be described. As described above, the PDL data obtaining unit 66 of the PC 50 obtains, from the work memory 80, the PDL data 90 which has been created from data whose printing was commanded by the user. Further, in the present embodiment, the data creation unit 70 (FIG. 1) is realized by the application stored in the program storage area 64, and the data creation unit 70 creates new PDL data from the PDL data 90. The contents of the processes executed by the data creation unit 70 are explained in detail below.

(New PDL Data Creation Process in the Case where 2 in 1 has been Commanded)

The data creation unit 70 executes the following process in the case where printing in accordance with 2 in 1 has been commanded by the user. FIG. 9 shows the PDL data 90 and new PDL data 300 created from the PDL data 90. The compressed parts 100 to 180 included in the PDL data 90 are the same as the compressed parts 100 to 180 shown in FIG. 2. The PDL data 90 of FIG. 9 further includes a compressed page part 190 and a compressed discard part 200. The compressed page part 190 (4.fpage) has a file name indicating the fourth page, and includes designation information 192 designating the compressed image part 140 (image2). The compressed discard part 200 (discard3) includes page information 202 (5.fpage) indicating the fifth page, and data information 204 indicating the compressed image part 140 (image2).

The data creation unit 70 first reads the file name of the compressed parts 100, etc. Next, based on the file name of the compressed parts 100, etc., the data creation unit 70 specifies all the compressed resource parts 100, 110, 140, 170 included in the PDL data 90. The compressed resource parts 100, etc. have file names that include character strings such as "image," "font," etc. The data creation unit 70 specifies the compressed resource parts 100, etc. by extracting the compressed parts that have file names including these character strings. The data creation unit 70 does not apply changes to the specified compressed resource parts 100, etc. Consequently, the new PDL data 300 includes the compressed resource parts 100, etc. included in the original PDL data 90.

Next, based on the file name of the compressed parts 100, etc., the data creation unit 70 specifies all the compressed page parts 120, 150, 180, 190 included in the PDL data 90. Each of the compressed page parts 120, etc. has a file name including the character string "fpage.". The data creation unit 70 specifies each of the compressed page parts 120, etc. by extracting each of the compressed part that has a file name including the character string.

Next, the data creation unit 70 creates decompressed page parts of the first and second pages by decompressing the original compressed page parts 120, 150 (1.fpage, 2.fpage) of the first and second pages. Next, the data creation unit 70 specifies the designation information 122, 124, 152, 154 by reading the decompressed page parts of the first and second pages. The data creation unit 70 creates a specific decompressed page part that includes the designation information 122, 124, 152, 154. The data creation unit 70 applies the file name "1.fpage" to the specific decompressed page part.

From the decompressed page part of the first page, the data creation unit 70 specifies a first location which is a location for the image (image1) of the case of 1 in 1, and a second location which is a location for the text ("ABC" of FIG. 3) of the case of 1 in 1. Further, from the decompressed page part of the second page, the data creation unit 70 specifies a third location which is a location for the image (image2) of the case of 1 in 1, and a fourth location which is a location for the text ("DEF" of FIG. 3) of the case of 1 in 1. The data creation unit 70 converts each of the first to fourth locations to locations of the case of 2 in 1. The data creation unit 70 creates the above specific decompressed page part which includes the converted locations for the resources (images and texts). The data creation unit 70 creates a new compressed page part 320 of a first page by compressing the above specific decompressed page part. As shown in FIG. 9, the new compressed page part 320 of the first page has the file name "1.fpage," and includes the designation information 122, 124, 152, 154 included in the original compressed page parts 120, 150 of the first and second pages.

Next, similar to the case of creating the new compressed page part 320 of the first page, the data creation unit 70 creates a new compressed page part 380 of a second page from original compressed page parts 180, 190 of the third and fourth pages. The new compressed page part 380 of the second page has the file name "2.fpage," and includes the designation information 182, 192 included in the original compressed page parts 180, 190 of the third page and fourth page. As is clear from the above description, the data creation unit 70 creates a new compressed page part (e.g., 320) for one page (1 page) from compressed page parts (e.g., 120, 150) for two successive pages (2 sets of page part data).

Next, the data creation unit 70 specifies all the compressed discard parts 130, 160, 200 included in the PDL data 90 based on the file names of the compressed parts 100, etc. Each of the compressed discard parts 130, etc. has a file name that includes the character string "discard." The data creation unit 70 specifies each of the compressed discard parts 130, etc. by extracting each of the compressed parts having a file name that includes this character string.

Next, the data creation unit 70 creates a first decompressed discard part by decompressing the compressed discard part 130 (discard1). Next, the data creation unit 70 specifies the page information 132 (2.fpage) and the data information 134 (image1) included in the first decompressed discard part. Below, the data information 134 specified here is called "first data information 134." Next, the data creation unit 70 specifies, from among all the new compressed page parts 320, 380 which have been completed, a compressed page part (called "greatest compressed page part" below) that has a file name corresponding to the greatest page number, this being the compressed page part that includes the file name "image1" indicated by the first data information 134. In the present embodiment, the compressed page part 320 (1.fpage) of the first page is specified. The data creation unit 70 determines whether the page information 132 (2.fpage) included in the first decompressed discard part is a page number (2.fpage) that is one greater than the page number (1.fpage) corresponding to the greatest compressed page part 320. In the case of a positive judgement, the data creation unit 70 does not apply changes to the page information 132 included in the first decompressed discard part. That is, in the present embodiment, the information that is the same as in the compressed discard part 130 included in the PDL data 90 is also included in the new PDL data 300. In the new PDL data 300, the compressed discard part 130 is positioned in a location that is behind the greatest compressed page part 320 (1.fpage), and that is before the compressed page part 380 (2.fpage), which is subsequent to the greatest compressed page part 320 (1.fpage). That is, in FIG. 9, the compressed discard part 130 is positioned below the greatest compressed page part 320 (1.fpage) and above the compressed page part 380 (2.fpage).

Next, the data creation unit 70 creates a second decompressed discard part by decompressing the compressed discard part 160 (discard2). Next, the data creation unit 70 specifies the page information 162 (3.fpage) and the data information 164 (font1) included in the second decompressed discard part. Below, the data information 164 specified here is called "second data information 164." Next, the data creation unit 70 specifies, from among all the new compressed page parts 320, 380 which have been completed, a compressed page part (greatest compressed page part) that has a file name corresponding to the greatest page number, this being the compressed page part that includes the file name "font 1" indicated by the second data information 164. In the present embodiment, the compressed page part 320 (1.fpage) of the first page is specified. The data creation unit 70 determines whether the page information 162 (3.fpage) included in the compressed discard part 160 is a page number (2.fpage) that is one greater than the page number (1.fpage) corresponding to the greatest compressed page part 320. In a case of a negative judgement, the data creation unit 70 changes the page information 162 (3.fpage) included in the second decompressed discard part to new page information 362 indicating the page number (2.fpage) that is one greater than the page number (1.fpage) corresponding to the greatest compressed page part 320. Next, the data creation unit 70 creates a new compressed discard part 360 by compressing a decompressed discard part that includes the new page information 362 that has been changed. The new compressed discard part 360 is positioned in a location that is behind the greatest compressed page part 320 (1.fpage), and that is before the compressed page part 380 (2.fpage), which is subsequent to the greatest compressed page part 320 (1.fpage).

Similar to the case of the compressed discard parts 130, 160, the data creation unit 70 creates a new compressed discard part 400 by changing the page information 202 (5.fpage) included in the compressed discard part 200 to new page information 402 (3.fpage). Moreover, the data information 204 (image2) included in the compressed discard part 200 is included in both of the two new compressed page parts 320, 380. Consequently, when the data creation unit 70 is to specify the greatest compressed page part, the data creation unit 70 specifies, between the two new compressed page parts 320, 380, the compressed page part 380 whose file name corresponds to the greatest page number (2.fpage). Consequently, the new compressed discard part 400 includes the new page information 402 which indicates the page number (3.fpage) that is one greater than the aforementioned greatest page number (2.fpage). The new compressed discard part 400 is positioned in a location that is behind the greatest compressed page part 380 (2.fpage), and that is before the subsequent compressed page part.

The process in the case of 2 in 1 has been described utilizing FIG. 9. Similarly, in the case of other N in 1 (3 in 1, 4 in 1, etc.), the process is performed identically to the case of 2 in 1. For example, if the user has commanded 3 in 1, a new compressed page part for one page is created from compressed page parts (e.g., 120, 150, 180) for three successive pages. Further, the method for creating the new compressed discard part from the compressed discard parts 160, etc. included in the PDL data 90 in the case of other N in 1 is identical to the case of 2 in 1.

According to the above processes, if the user has commanded N in 1, the PC 50 can create the new PDL data 300 from the PDL data 90. In the case where the new PDL data 300 has been sent to the printer 10 from the PC 50, the printer 10 executes the 1 in 1 process (FIG. 6) utilizing the new PDL data 300, resulting in the drawing data 220, 222 shown in FIG. 4 being created. The printer 10 can create the drawing data 220, 222 corresponding to the command of the user without executing the N in 1 process (FIG. 7). Moreover, the printer 10 can delete the resource part at the appropriate timing in accordance with the new compressed discard parts 360, etc. during execution of the 1 in 1 process. Further, in the case where the new PDL data 300 is sent from the PC 50 to the printer 10, the PC 50 sends the print instruction 92 which includes the print information 94 indicating 1 in 1 to the printer 10.

(New PDL Data Creation Process in the Case where 1 in 2 has been Commanded)

The data creation unit 70 executes the following process in the case where printing in accordance with 1 in 2 has been commanded by the user. FIG. 10 shows the PDL data 90 and new PDL data 400 created from the PDL data 90. The PDL data 90 of FIG. 10 is the same as the PDL data 90 of FIG. 2.

Similar to the case of the new PDL data creation process in the case where 2 in 1 has been commanded (FIG. 9), the data creation unit 70 does not apply changes to the compressed resource parts 100, 110, 140, 170 during creation of the new PDL data 400.

The data creation unit 70 creates a decompressed page part of the first page by decompressing the original compressed page part 120 (1.fpage) of the first page. Next, the data creation unit 70 specifies the designation information 122, 124 by reading the decompressed page part of the first page. Further, the data creation unit 70 specifies the locations for the resources (image1 and "ABC" of FIG. 3) of the case of 1 in 1 from the decompressed page part of the first page, and converts these locations to locations of the case of 1 in 2.

The data creation unit 70 creates a new decompressed page part of the first page that includes the designation information 122, 124 specified from the decompressed page part of the first page, and the converted locations of the resources. The data creation unit 70 applies the file name "1.fpage" to the new decompressed page part of the first page. The data creation unit 70 creates a new compressed page part 420a of the first page by compressing the new decompressed page part of the first page. Further, the data creation unit 70 creates a new decompressed page part of the second page that includes the designation information 122 specified from the decompressed page part of the first page, and the converted location of the resource. In the drawing data 232 of the second page of FIG. 5, only the image "image1" is included, and the text "ABC" is not included. Consequently, the new decompressed page part of the second page does not include the designation information 124 indicating "font1" The data creation unit 70 applies the file name "2.fpage" to the new decompressed page part of the second page. The data creation unit 70 creates a new compressed page part 420b of the second page by compressing the new decompressed page part of the second page.

Similar to the case of the compressed page part 120 of the first page, the data creation unit 70 creates new compressed page parts 450a, 450b for two pages from the original compressed page part 150 of the second page. The new compressed page part 450a has the file name "3.fpage," and includes the designation information 152, 154 included in the original compressed page part 150 of the second page. The new compressed page part 450b has the file name "4.fpage," and includes the designation information 152 included in the original compressed page part 150 of the second page.

The data creation unit 70 creates new compressed page parts 480a, 480b from the original compressed page part 180 of the third page. The new compressed page part 480a has the file name "5.fpage," and includes the designation information 182 included in the original compressed page part 180 of the third page. The new compressed page part 480b has the file name "6.fpage," and includes the designation information 182 included in the original compressed page part 180 of the third page. As is clear from the above description, the data creation unit 70 creates a new compressed page part (e.g., 420a, 420b) for two successive pages (2 pages) from a compressed page part (e.g., 120) for one page (1 page).

Next, the data creation unit 70 creates new compressed discard parts from the original compressed discard parts 130, 160. The method for creating the new compressed discard parts is the same as the new PDL data creation process (FIG. 9) in the case where 2 in 1 has been commanded. That is, the data creation unit 70 creates a first decompressed discard part from the compressed discard part 130 (discard1), and specifies the page information 132 (2.fpage) and the data information 134 (image1). Next, the data creation unit 70 specifies, from among all the new compressed page parts 420a, 420b, 450a, 450b, 480a, 480b which have been completed, a compressed page part (the greatest compressed page part) that has a file name corresponding to the greatest page number, this compressed page part being the compressed page part that includes the file name "image1" indicated by the first data information 134. In the present embodiment, the compressed page part 420b (2.fpage) of the second page is specified. The data creation unit 70 changes the page information 132 (2.fpage) included in the first decompressed discard part to new page information 432 indicating the page number (3.fpage) that is one greater than the page number (2.fpage) corresponding to the aforementioned greatest compressed page part. Next, the data creation unit 70 creates a new compressed discard part 430 by compressing a decompressed discard part that includes the new page information 432. The new compressed discard part 430 is positioned in a location that is behind the greatest compressed page part 420b (2.fpage) and before the compressed page part 450a (3.fpage) which is subsequent to the greatest compressed page part 420b (2.fpage). For the second compressed discard part 160 as well, the data creation unit 70 creates, by executing the same process, a new compressed discard part 460 that includes new page information 462.

The process in the case of 1 in 2 has been described utilizing FIG. 10. Similarly, in the case of other 1 in N (e.g., 1 in 3, 1 in 4, etc.), the process is performed identically to the case of 1 in 2. For example, if the user has commanded 1 in 3, new compressed page parts for three successive pages are created from a compressed page part (e.g., 120) for one page. Further, in the case of other 1 in N, the method is identical to the case of 1 in 2 for creating new compressed discard parts from the compressed discard parts 130, etc. included in the PDL data 90.

According to the above process, if the user has commanded 1 in N, the PC 50 can create the new PDL data 400 from the PDL data 90. In a case where the new PDL data 400 has been sent to the printer 10 from the PC 50, the printer 10 utilizes the new PDL data 400 to execute the process in accordance with the 1 in 1 process (FIG. 6), and can thereby create the drawing data 230 to 240 shown in FIG. 5. The printer 10 can create the drawing data 230 to 240 corresponding to the command of the user without executing the 1 in N process of FIG. 8. Moreover, the printer 10 can delete the resource parts at the appropriate timing in accordance with the new compressed discard parts 430, etc. during execution of the 1 in 1 process. Further, in the case where the new PDL data 400 is sent from the PC 50 to the printer 10, the PC 50 sends the print instruction 92 which includes the print information 94 indicating 1 in 1 to the printer 10.

The relationship between the configurations of the second embodiment and the elements of the present invention will be described. In the case of 2 in 1 of FIG. 9, the new compressed page part 320 corresponds to "specific set of new page part data". In this case, the compressed discard part 160 and the compressed font part 110 are respectively examples of "specific set of deletion part data" and "specific set of resource part data". Further, the new compressed page part 380 can also be considered to correspond to "specific set of new page part data". In the case of 1 in 2 of FIG. 10, the new compressed page part 420b corresponds to "specific set of new page part data". In this case, the compressed discard part 130 and the compressed image part 100 are respectively examples of "specific set of deletion part data" and "specific set of resource part data". Further, the other new compressed page parts 450a, 450b can also be considered to correspond to "specific set of new page part data".

(1) The technique of the aforementioned embodiments can also be applied in cases where types of PDL data other than XPS data are utilized. For example, the technique can also be applied in cases where PDF, PS (Post Script), etc. are utilized. Moreover, the term "PDL data" of the present specification is a concept including all types of data described utilizing the concept of a page.

(2) For example, in the aforementioned embodiments, a plurality of compressed discard parts 130, 160 (FIG. 2) is included in the PDL data 90. However, only one compressed discard part may be included in the PDL data 90. In this case, the one compressed discard part includes the information 132, 134, 162, 164 included in the plurality of compressed discard parts 130, 160. That is, a command for deleting a plurality of compressed resource parts may be included in the one, single compressed discard part.

(3) Further, in the first embodiment, the printer 10 is capable of executing both the N in 1 process (FIG. 7) and the 1 in N process (FIG. 8). However, the printer 10 may be capable of executing only one of the N in 1 process and the 1 in N process.

(4) In the above embodiment, a plurality of units 26, 30, 32 of the printer 10 is realized as a result of the CPU 22 executing processes according to the program stored in the program storage area 24. However, all of or a part of the plurality of units 26, 30, 32 may be realized by hardware such as logical circuits. Further, in the above embodiment, a plurality of units 66, 70 of the PC 50 is realized as a result of the CPU 62 executing processes according to the program stored in the program storage area 64. However, all of or a part of the plurality of units 66, 70 may be realized by hardware such as logical circuits.

What is claimed is:

1. A Page Description Language (PDL) data processing device, comprising:
  a processor; and
  memory storing instructions that, when executed by the processor, cause the PDL data processing device to:
  obtain PDL data including a set of resource part data, a set of page part data, and a set of deletion part data, wherein the set of the page part data is associated with a page number and includes designation information designating the set of the resource part data, and the set of the deletion part data includes page information indicating a page number and data information indicating the set of the resource part data;
  create drawing data by utilizing the set of the page part data and the set of the resource part data designated by the designation information included in the set of the page part data; and
  delete the set of the resource part data indicated by the data information included in the set of the deletion part data,
  wherein the instructions further cause the PDL data processing device to:
  in a first case where the drawing data for one page is to be created utilizing sets of the page part data for N pages, or in a second case where the drawing data for N pages is to be created utilizing a set of the page part data for one page, the N being an integer equal to 2 or more, regardless of a page number M of the drawing data which has been actually created, the M being an integer equal to 1 or more, subsequent to a creation for a first set of the drawing data by utilizing a first set of the page part data being associated with a page number L, and prior to a creation for a second set of the drawing data by utilizing a second set of the page part data being associated with a page number L+1, the L being an integer equal to 1 or more, delete a first set of the resource part data indicated by a first set of the data information included in a first set of the deletion part data including a first set of the page information indicating the page number L+1.

2. The PDL data processing device as in claim 1, wherein the instructions further cause the PDL data processing device to:

in a case where the drawing data for one page is to be created utilizing a set of the page part data for one page, in accordance with the page number M of the drawing data which has been actually created, subsequent to a creation for a third set of the drawing data of the page number M by utilizing a third set of the page part data being associated with the page number M, and prior to a creation for a fourth set of the drawing data of the page number M+1 by utilizing a fourth set of the page part data being associated with the page number M+1, delete a second set of the resource part data indicated by a second set of the data information included in a second set of the deletion part data including a second set of the page information indicating the page number M+1.

3. The PDL data processing device as in claim 1, further comprising:

a print executing unit configured to execute print in accordance with the drawing data, wherein in the first case or the second case, the instructions further cause the PDL data processing device to delete the first set of the resource part data subsequent to the creation for the first set of the drawing data and prior to an execution of the print in accordance with the first set of the drawing data.

4. A Page Description Language (PDL) data processing device, comprising:

a processor; and memory storing instructions that, when executed by the processor, cause the PDL data processing device to:

obtain PDL data including a set of resource part data, a set of page part data, and a set of deletion part data, wherein the set of the page part data is associated with a page number and includes designation information designating the set of the resource part data, and the set of the deletion part data includes page information indicating a page number and data information indicating the set of the resource part data; and create new PDL data including the set of the resource part data, a set of new page part data, and a set of new deletion part data from the PDL data, in a first case where the drawing data for one page is to be created utilizing sets of the page part data for N pages, or in a second case where the drawing data for N pages is to be created utilizing a set of the page part data for one page, the N being an integer equal to 2 or more, wherein the instructions further cause the PDL data processing device to:

in the first case or the second case, create the set of the new page part data being associated with a new page number from the set of the page part data included in the PDL data such that the drawing data for one page is created utilizing a set of the new page part data for one page, and create the set of the new deletion part data by changing the page information included in the set of the deletion part data included in the PDL data into new page information determined in accordance with the new page number.

5. The PDL data processing device as in claim 4, wherein the instructions further cause the PDL data processing device to:

create one set of the new page part data for one page from N sets of the page part data for N pages included in the PDL data in the first case, and create N sets of the new page part data for N pages from one set of the page part data for one page included in the PDL data in the second case.

6. The PDL data processing device as in claim 4, wherein the instructions further cause the PDL data processing device to:

in the first case or the second case, further in which the PDL data includes a specific set of the deletion part data including specific page information and specific data information indicating a specific set of the resource part data, and a specific set of the new page part data including specific designation information designating the specific set of the resource part data is created, create a specific set of the new deletion part data by changing the specific page information included in the specific set of the deletion part data into specific new page information indicating a page number which is greater than a specific new page number being associated with the specific set of the new page part data.

7. The PDL data processing device as in claim 6, wherein the instructions further cause the PDL data processing device to:

in the first case or the second case, further in which each of plural sets of the new page part data includes the specific designation information, select the specific set of the new page part data being associated with a maximum page number among the plural sets of the new page part data, and change the specific page information included in the specific set of the deletion part data into the specific new page information indicating a page number which is greater than the specific new page number being associated with the selected specific set of the new page part data.

8. The PDL data processing device as in claim 6, wherein the specific new page information indicates a page number obtained by incrementing the specific new page number by one.

9. A non-transitory computer readable medium storing a computer program, the computer program including instructions for ordering a computer to perform:

obtaining Page Description Language (PDL) data including a set of resource part data, a set of page part data, and a set of deletion part data, wherein the set of the page part data is associated with a page number and includes designation information designating the set of the resource part data, and the set of the deletion part data includes page information indicating a page number and data information indicating the set of the resource part data; and creating new PDL data including the set of the resource part data, a set of new page part data, and a set of new deletion part data from the PDL data, in a first case where the drawing data for one page is to be created utilizing sets of the page part data for N pages, or in a second case where the drawing data for N pages is to be created utilizing a set of the page part data for one page, the N being an integer equal to 2 or more, wherein the creating the new PDL data includes:

in the first case or the second case, creating the set of the new page part data being associated with a new page number from the set of the page part data included in the PDL data such that the drawing data for one page is created utilizing a set of the new page part data for one page, and creating the set of the new deletion part data by changing the page information included in the set of the deletion part data included in the PDL data into new page information determined in accordance with the new page number.

* * * * *